United States Patent
Hayakawa et al.

(10) Patent No.: US 6,328,272 B1
(45) Date of Patent: Dec. 11, 2001

(54) SEAT SLIDE UNIT

(75) Inventors: Hatsuo Hayakawa; Masao Nihei; Shinichiro Kita; Hideyuki Sagara, all of Yokohama (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 09/268,746

(22) Filed: Mar. 17, 1999

(30) Foreign Application Priority Data

| Mar. 17, 1998 | (JP) | 10-066707 |
| Mar. 17, 1998 | (JP) | 10-066708 |
| Mar. 25, 1998 | (JP) | 10-077158 |

(51) Int. Cl.$^7$ .................................................. F16M 13/00
(52) U.S. Cl. ........................ 248/429; 248/430; 296/65.09
(58) Field of Search .................................. 248/429, 424, 248/419, 421, 423, 430; 296/65.09

(56) References Cited

U.S. PATENT DOCUMENTS

| 4,043,529 | * | 8/1977 | Pickles | 248/419 |
| 4,565,344 | | 1/1986 | Iwami | 248/429 |
| 4,629,254 | | 12/1986 | Stolper et al. | 297/473 |
| 4,726,617 | | 2/1988 | Nishimura | 296/65 R |
| 4,852,846 | * | 8/1989 | Weier | 248/430 |
| 4,927,110 | | 5/1990 | Tsumura et al. | 248/430 |
| 4,949,932 | | 8/1990 | Terai | 240/430 |
| 4,958,799 | * | 9/1990 | Clauw et al. | 248/430 |
| 4,964,608 | * | 10/1990 | Rogala et al. | 248/429 |
| 5,286,076 | * | 2/1994 | DeVoss et al. | 296/65.1 |
| 5,740,999 | * | 4/1998 | Yamada | 248/429 |
| 5,755,422 | * | 5/1998 | Susko et al. | 248/430 |
| 5,882,074 | * | 3/1999 | Kojima | 297/341 |
| 5,918,846 | * | 7/1999 | Garrido | 248/429 |
| 5,918,847 | * | 7/1999 | Couasnon | 248/430 |
| 5,946,442 | * | 10/1999 | Wingblad et al. | 248/429 |
| 6,036,267 | * | 3/2000 | Downey et al. | 297/341 |

FOREIGN PATENT DOCUMENTS

| 0 751 029 | 1/1997 | (EP) . |
| 8-295164 | 11/1996 | (JP) . |
| 9-48264 | 2/1997 | (JP) . |
| 94/21486 | 9/1994 | (WO) . |

OTHER PUBLICATIONS

Kosaka Koji, "Seat Adjuster For Vehicle Seat.", Patent Abstract of Japan, #58016929, Jan. 31, 1983.

* cited by examiner

Primary Examiner—Anita King
(74) Attorney, Agent, or Firm—Foley & Lardner

(57) ABSTRACT

Only a left lock mechanism is coupled directly to an operation bar of comparatively high rigidity and a right lock mechanism is coupled to the left lock mechanism via a wire as a coupling member. The operation bar is rotatably supported at left and right end parts in left and right upper rails. The right end part is rotatably supported in a support pin of a bracket attached to the right upper rail slidably from side to side. A guide hole fitted slidably to an end part of an operation bar is made in a link for coupling the left lock mechanism and the end of the operation bar. A ring bushing made of a resin as a buffer member is fitted into the guide hole and is formed with an opposed face part opposed to the end part of the operation bar and an elastic piece pressed against the upper face of the operation bar.

12 Claims, 15 Drawing Sheets

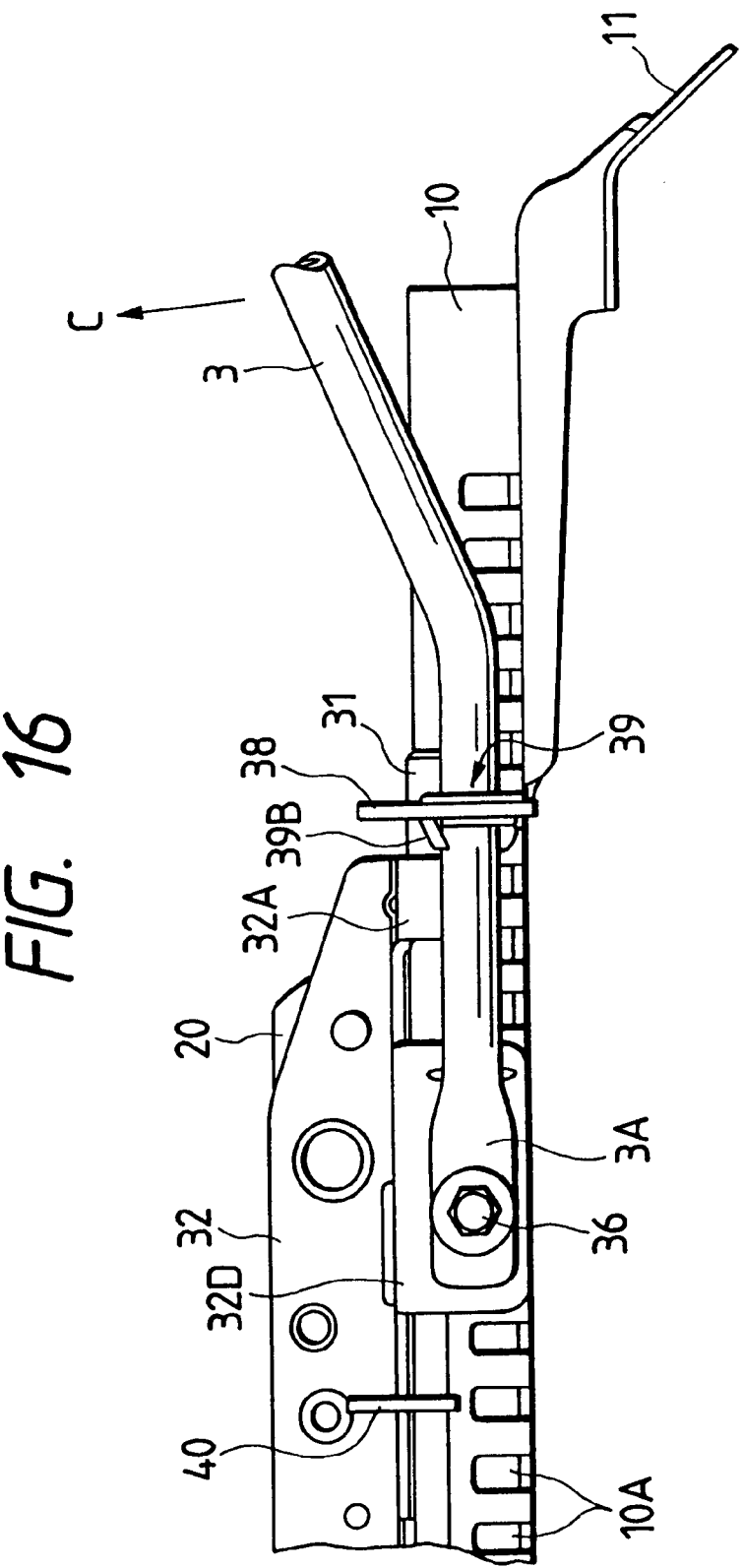

SEAT SLIDE UNIT

BACKGROUND OF THE INVENTION

1. Field of the Invention

This invention relates to a seat slide unit in a vehicle, etc., and more particularly to a seat slide unit comprising an operation bar extending from side to side on the lower side of a seat for operating lock mechanisms between lower and upper rails.

The present application is based on Japanese Patent Applications No. Hei. 10-66707, 10-66708 and 10-77158, which are incorporated herein by reference.

2. Description of the Related Art

As a seat slide unit, the following type one is known.

An operation bar in such a seat slide unit, which is substantially U-shaped, is also known as a towel bar while the seat slide unit is also known as a towel bar type slide unit. Left and right lock mechanisms are locked and unlocked by manipulating the operation bar. The left and right lock mechanisms comprise left and right upper rails on the seat bottom side that can be locked and unlocked with respect to left and right lower rails on the floor side. The left lock mechanism is placed between the left lower rail and the left upper rail and the right lock mechanism is placed between the right lower rail and the right upper rail. The operation bar is rotatably supported at both end parts in front portions of the left and right upper rails for rotation and is extended in the intermediate portion substantially in a horizontal direction from side to side. The operation bar is coupled at both end parts to the left and right lock mechanisms. It is rotated upward, whereby the left and right lock mechanisms are unlocked synchronously so as to enable slide adjustment of the seat back and forth. The operation bar is restored downward, whereby the left and right lock mechanisms are locked synchronously so as to lock the seat at the slide adjustment position.

If the seat slide unit comprises a rod that can be rotated on the back-and-forth axis at a constant position of the upper rail, for example, and the lock mechanism is locked or unlocked in response to the rotation direction of the rod, the rod and the end part of the operation bar are coupled by a link. That is, the link is attached at a base end part to the rod and engages at a tip part the operation bar, whereby the lock mechanism is operated in response to the rotation direction of the operation bar. In this structure, the tip part of the link rotated on the back-and-forth axis engages the end part of the operation bar rotated on the side-to-side axis, thus the engagement position of the tip part of the link and the end part of the operation bar shifts in the length direction of the link in response to the rotation position of the operation bar.

By the way, the operation bar in the seat slide unit has comparatively high rigidity, for example, as a steel pipe about 12 mm in diameter bent substantially like 1.1 considering the strength and operability of the operation bar.

However, since the conventional seat slide unit comprises the left and right lock mechanisms coupled directly to both end parts of the operation bar of comparatively high rigidity, for example, if the positional relationship between the left and right upper rails shifts because of an attachment accuracy error of the unit itself, dimension errors of the components, deformation of the components at the operation time, etc., it is feared that a large deformation load may be imposed on the coupling parts of the operation bar and the left and right lock mechanisms and interfere with smooth operation of the left and right lock mechanisms, making it impossible to cause the left and right lock mechanisms to lock and unlock reliably in synchronization with each other.

Further, since the operation bar of comparatively high rigidity is rotatably supported at both ends at constant points of the left and upper rails, it is feared that a large deformation load may be imposed on the rotatably-supporting parts at both ends of the operation bar and interfere with smooth operation of the lock mechanisms, for example, because of an attachment accuracy error of the unit itself, dimension errors of the components, deformation of the components at the operation time, etc., making it impossible to cause the lock mechanisms to lock and unlock reliably. On the other hand, if attachment accuracy of the unit itself and dimension accuracy of the components are enhanced, a new problem of incurring an increase in costs of the whole unit accordingly arises.

Still further, in the conventional seat slide unit comprising such a link, the steel link engages the steel operation bar directly. However, since the conventional seat slide unit comprises the steel link engaging the steel operation bar directly, it is feared that a rattle or noise may occur in the engagement part of the link and the operation bar. To prevent a rattle or noise from occurring, it becomes necessary to urge the operation bar by a spring so as to elastically strongly press the engagement part of the link and the operation bar or guide a shift in the engagement part of the link and the operation bar with high accuracy, resulting in complication of the structure of the whole unit and high costs.

SUMMARY OF THE INVENTION

It is therefore an object of the invention to provide a seat slide unit wherein while usefulness of operating left and right mechanisms with an operation bar placed between left and right upper rails is provided, the effect of an attachment accuracy error of the unit itself, dimension errors of the components, deformation of the components at the operation time, etc., is lessened and the left and right lock mechanisms can be caused to lock and unlock smoothly and reliably in synchronization with each other with the operation bar.

It is another object of the invention to provide a seat 5 slide unit for making it possible to suppress noise or a rattle in the engagement part of a link and an end of an operation bar and to simplify the structure of the whole unit and reduce costs.

A seat slide unit comprises left and right upper rails being attached on a bottom of a seat and extending back and forth relative to the seat, and left and right lower rails for guiding the left and right upper rails slidably back and forth relative to the seat.

According to a first aspect of the invention, the seat slide unit has a left lock mechanism being capable of locking and unlocking the left upper rail with respect to the left lower rail, a right lock mechanism being capable of locking and unlocking the right upper rail with respect to the right lower rail, an operation bar being rotatably supported at left and right end parts in front parts of the left and right upper rails and extending in an intermediate portion from side to side for causing one of the left and right lock mechanisms to lock and unlock in response to a rotation direction of the intermediate portion, and a coupling member being coupled at left and right end parts to the left and right lock mechanisms and shaped so as to absorb a warp between the left and right end parts for causing the other to lock and unlock in conjunction with one of the left and right lock mechanisms.

According to a second aspect of the invention, the seat slide unit has an operation bar being rotatably supported at left and right end parts between the left and right upper rails and rotatably supported at one of the left and right end parts slidably from side to side, and lock mechanisms being capable of locking and unlocking the left and right upper rails with respect to the left and right lower rails in response to a rotation direction of the operation bar.

According to a third aspect of the invention, the seat slide unit has an operation bar being shaped roughly like U in plan and rotatably supported at both end parts in the left and right upper rails on a side-to-side axis, left and right lock mechanisms being capable of locking and unlocking the left and right upper rails with respect to the left and right lower rails in response to a rotation direction of the operation bar, wherein at least one of the left and right lock mechanisms is coupled to the operation bar via a link being rotatably supported at a base end part in the upper rail on an axis almost along a back-and-forth direction and engaging at a tip part an end part of the operation bar, and a buffer member being attached to the tip part of the link, the buffer member being made of a resin, and having an opposed face part opposed to the end part of the operation bar and an elastic piece elastically pressed against the end part of the operation bar.

Features and advantages of the invention will be evident from the following detailed description of the preferred embodiments described in conjunction with the attached drawings.

BRIEF DESCRIPTION OF THE DRAWINGS

In the accompanying drawings:

FIG. 16 is a XVI arrow view of FIG. 15;

DETAILED DESCRIPTION OF THE PREFERRED EMBODIMENTS

Referring now to the accompanying drawings, there are shown preferred embodiments of the invention. Application examples as a seat slide unit for a right seat of a vehicle will be discussed.

Figure 1:
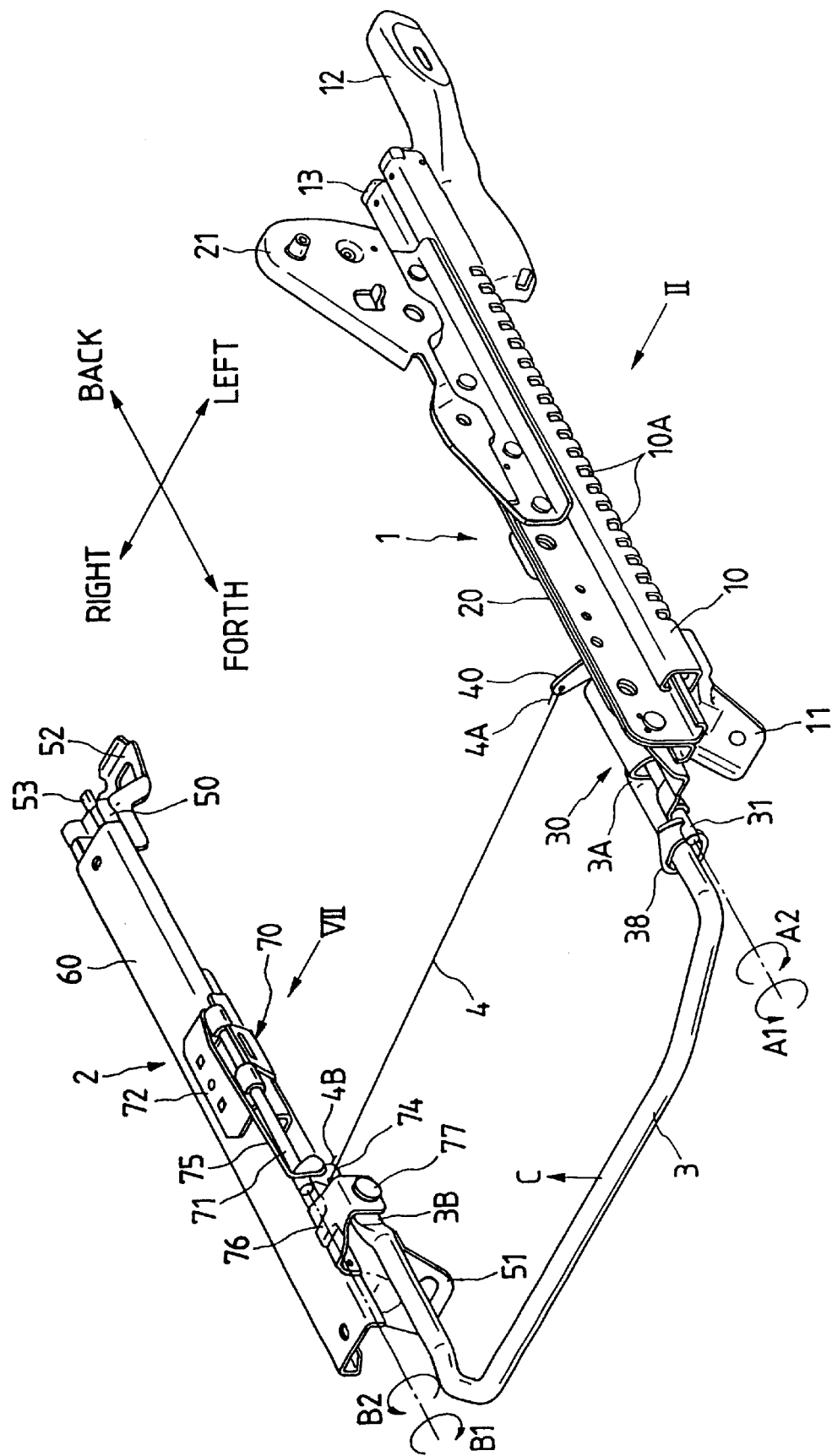
FIG. 1 a perspective view of the whole of a seat slide unit of the invention.
Figure 2:
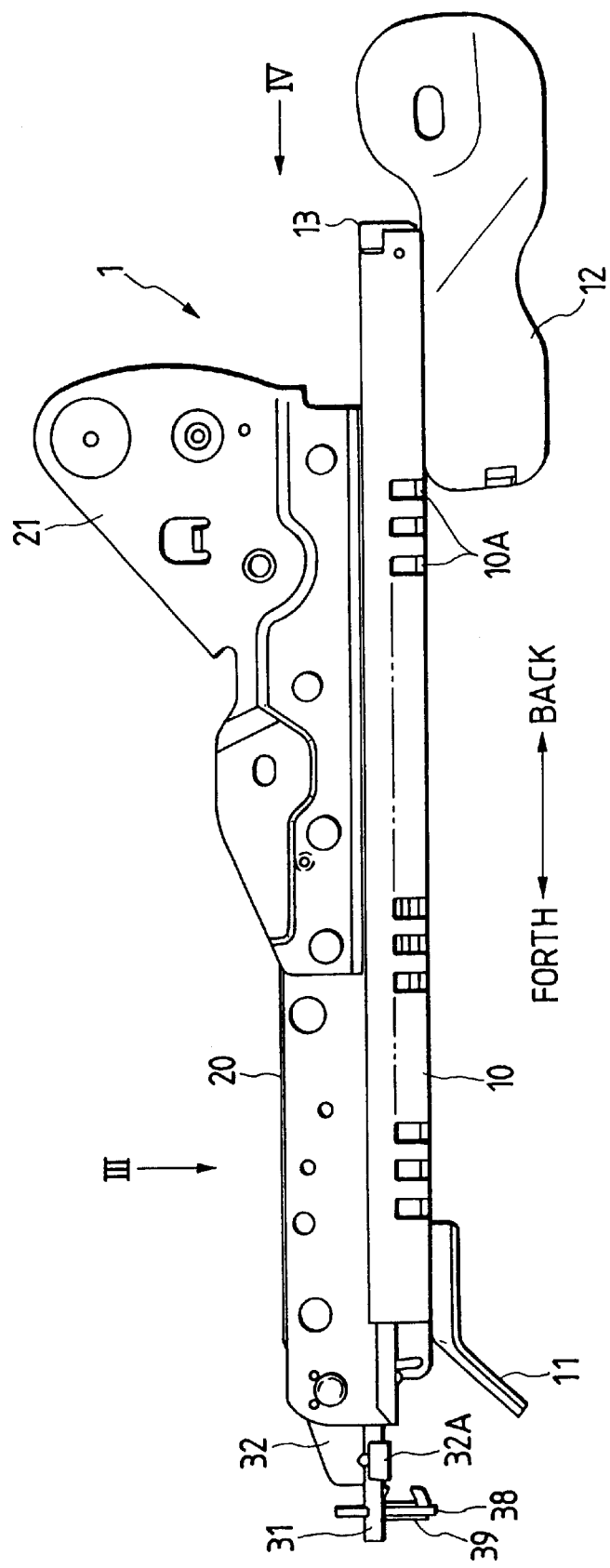
FIG. 2 is a II arrow view of FIG. 1.

FIG. 1 is a perspective view of the whole of a seat slide unit of the invention. In the figure, numerals 1 and 2 denote left and right slide mechanisms. The left slide mechanism 1 is installed in the lower right portion of a right seat of a vehicle, namely, to the center of the vehicle (inner side) and the right slide mechanism 2 is installed in the lower right portion of the right seat, namely, to the outside of the vehicle (outer side). The left and right slide mechanisms 1 and 2 are related to each other by an operation bar 3 also called a towel bar and a wire 4 as a coupling member. The left and right slide mechanisms 1 and 2, the operation bar 3, and the wire 4 will be discussed separately.

Left slide mechanism 1

Figure 5:
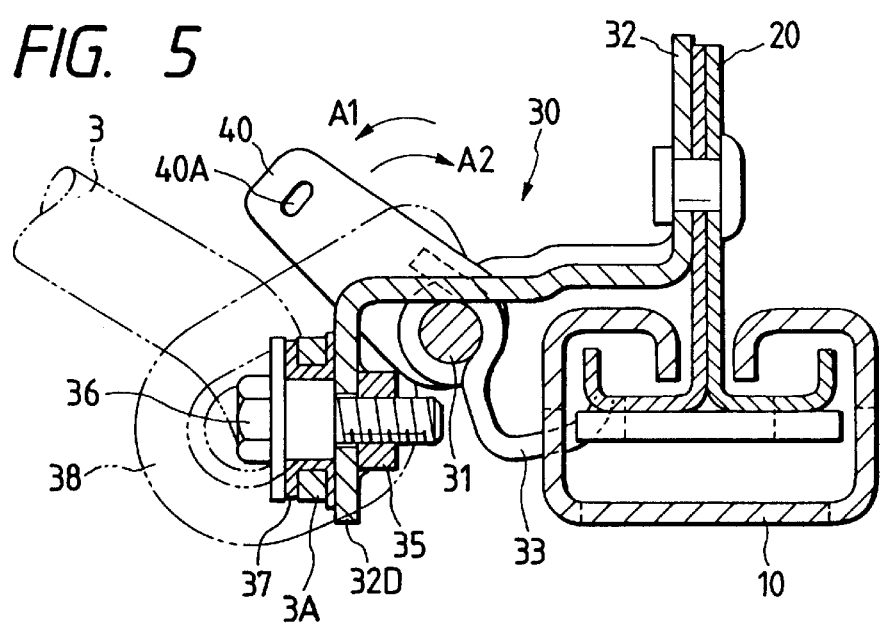
FIG. 5 is a sectional view taken along line V—V in FIG. 3.

The left slide mechanism 1 comprises a lower rail 10, an upper rail 20, and a lock mechanism 30, as shown in FIGS. 2 to 6. The lower rail 10 is fixed onto the floor of the vehicle by front and rear brackets 11 and 12. The upper rail 20 is attached to the left bottom of the seat and is guided slidably back and forth relative to the lower rail 10. In the embodiment, the upper rail 20 shaped roughly like inverse T in cross section comprising two plates joined is guided slidably in the lower rail 10 shaped roughly like U in cross section, as shown in FIG. 5. A roller, a slider, and the like (not shown) are disposed in the lower rail so that the upper rail 20 can slide smoothly. A plate 21 for forming an attachment part of a seat belt (not shown) is joined 25 to the rear end part of the upper rail 20. Numeral 13 denotes a cap attached to the rear end of the lower rail 10.

Figure 6:
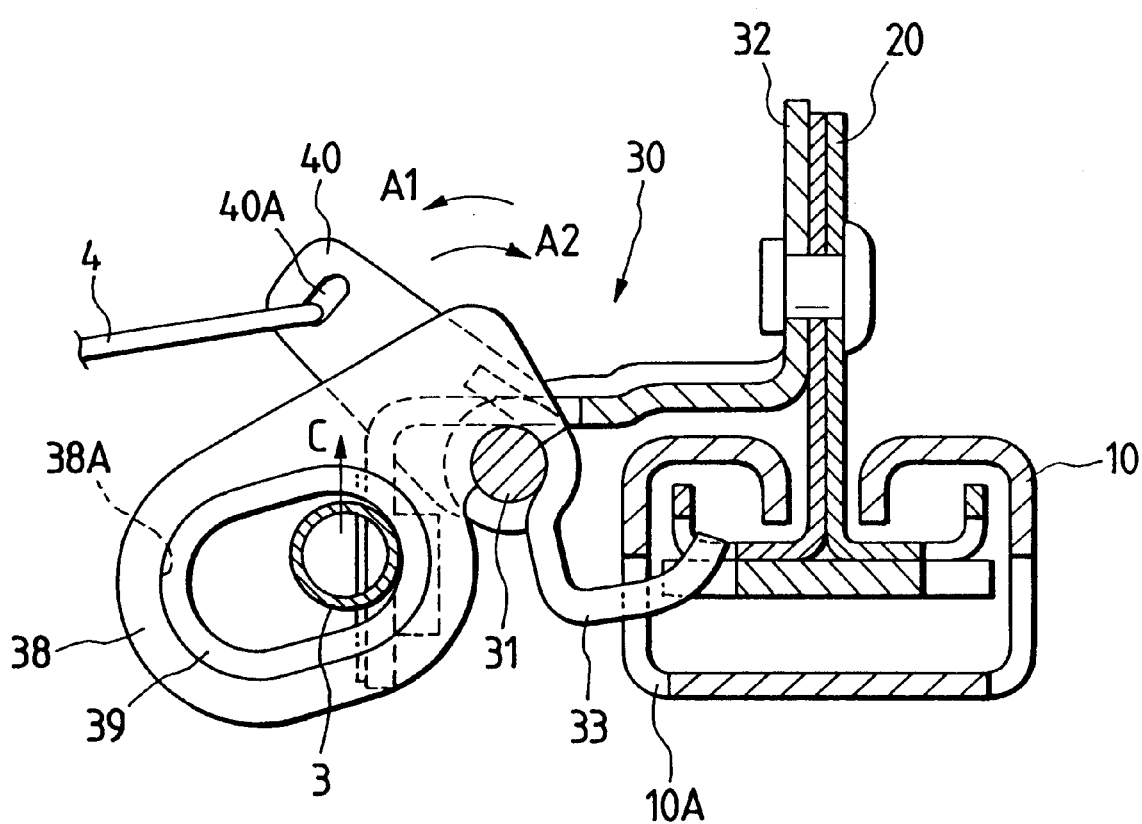
FIG. 6 is a sectional view taken along line VI—VI in FIG. 3.
Figure 7:
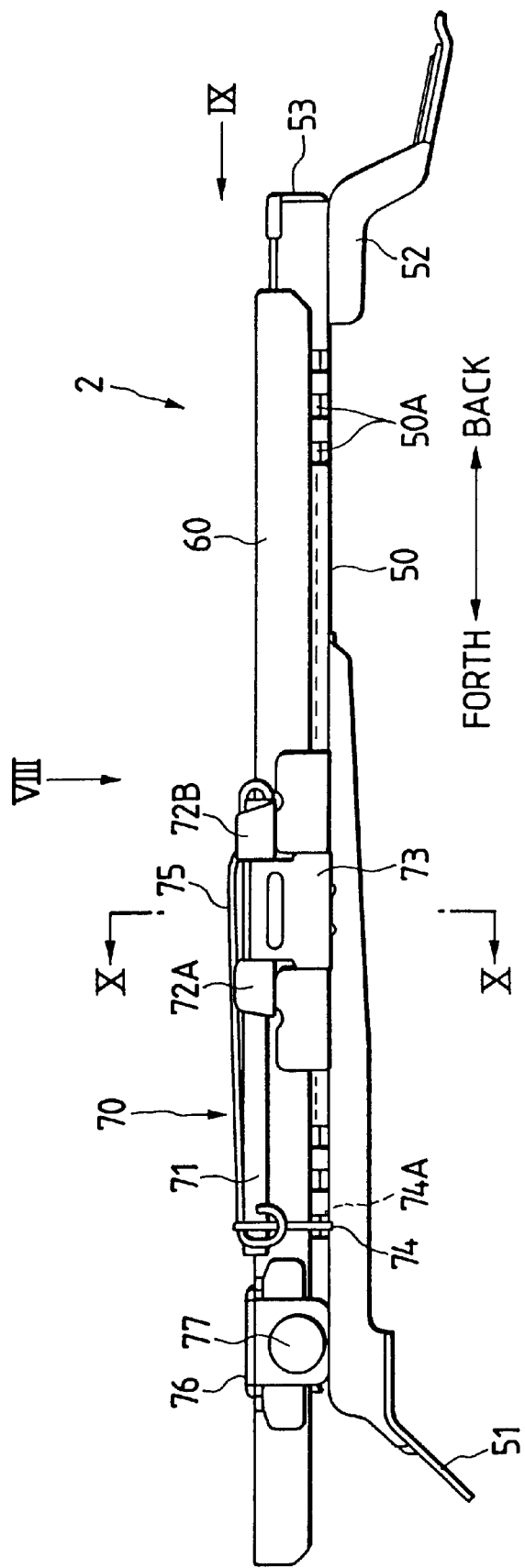
FIG. 7 is a VII arrow view of FIG. 1.
Figure 8:
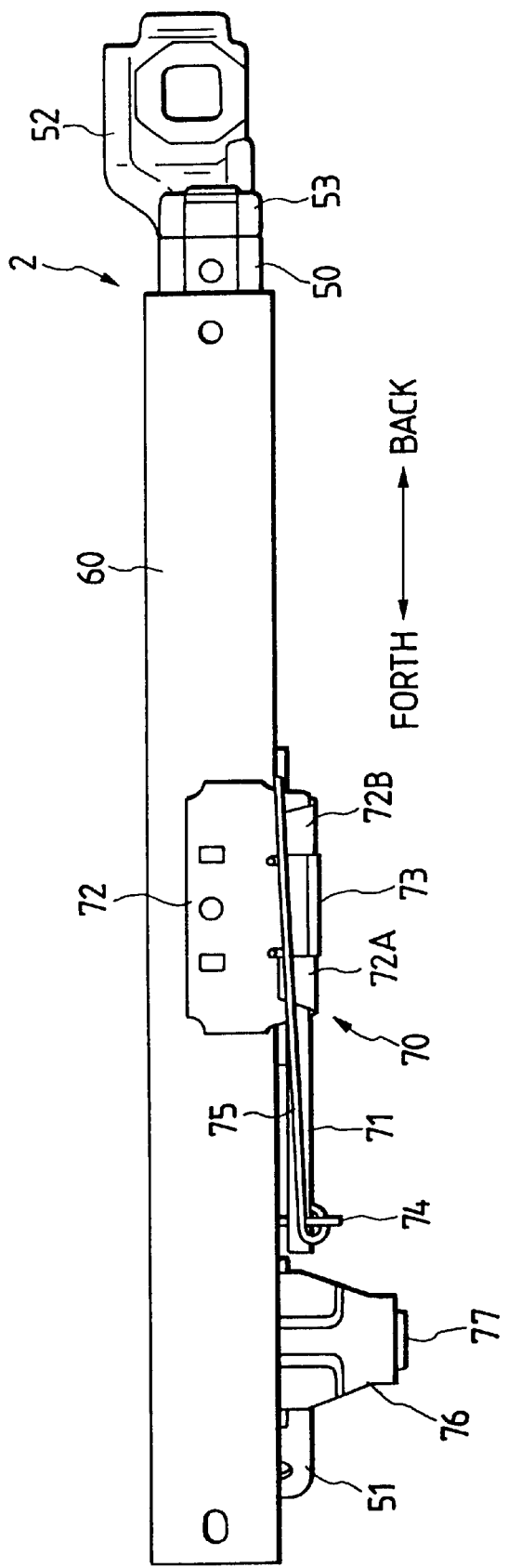
FIG. 8 is a VIII arrow view of FIG. 7.
Figure 9:
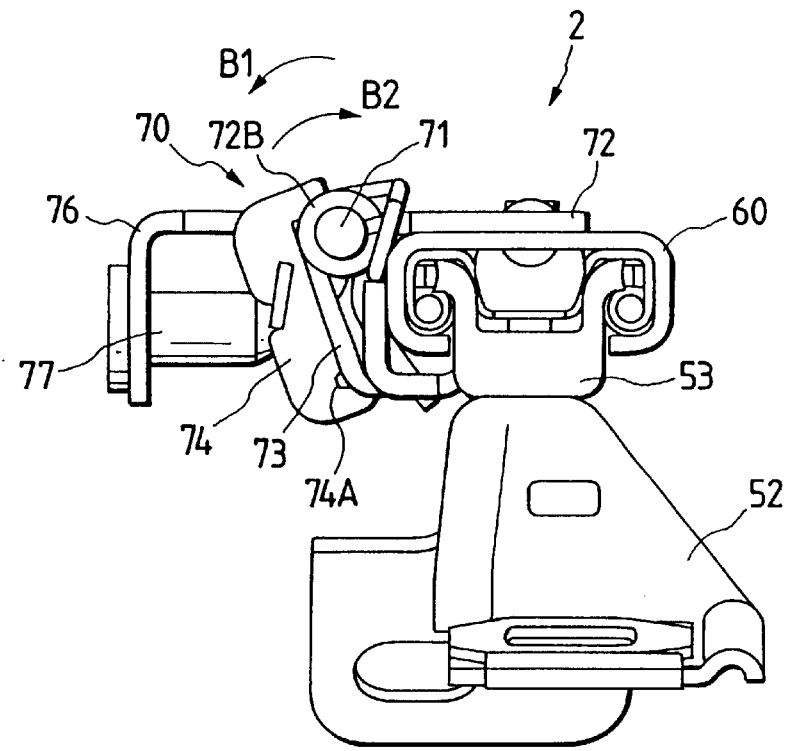
FIG. 9 is a IX row view of FIG. 7.

The lock mechanism 30 locks the upper rail 20 at any desired slide adjustment position. In the embodiment, it locks and unlocks the upper rail 20 in response to the rotation direction of a rod 31. That is, the rod 31 is rotatably supported in bearing parts 32A, 32B, and 32C (see FIG. 3) of a bracket 32 joined to the upper rail 20 so that it can be rotated on the back-and-forth axis in the arrow A1 and A2 directions (see FIGS. 5 and 6). A latch 33 is attached to the rod 31 and a plurality of lock holes 10A are made in a side of the lower rail 10. When the rod 31 is rotated in the arrow AI direction, as shown in FIG. 6, the latch 33 is fitted into the opposed lock hole 10A for locking the upper rail 20 and when the rod 31 is rotated in the arrow A2 direction, the latch 33 is detached from the lock hole 10A for unlocking the upper rail 20. A twist coil sprint 34 for urging the rod 31 in the arrow A1 direction is attached between the rear end of the rod 31 and the upper rail 20.

Figure 3:
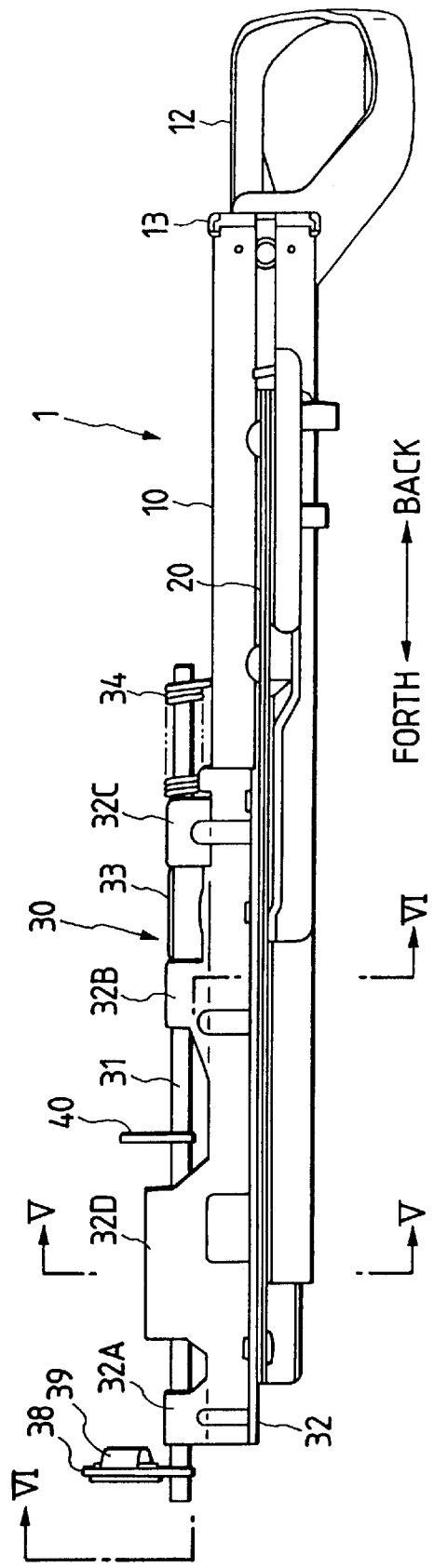
FIG. 3 is a III arrow view of FIG. 1.
Figure 4:
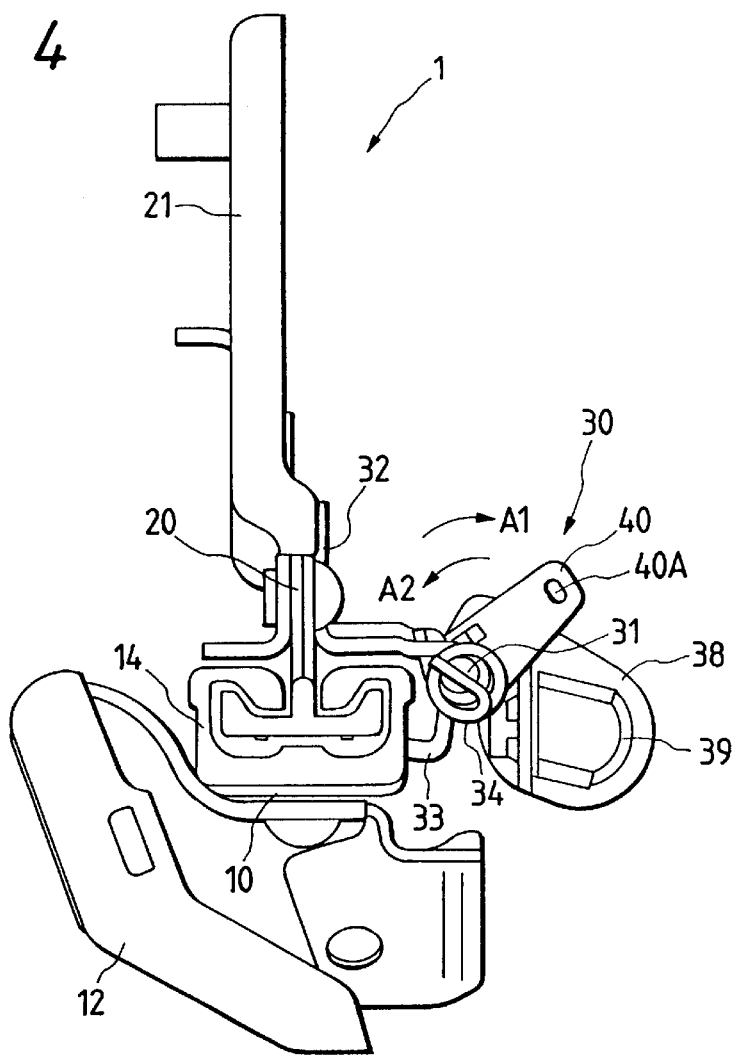
FIG. 4 Is a IV arrow view of FIG. 1.

A nut 35 is welded to an inner constant position of a bend part 32D of the bracket 32 (see FIGS. 3 and 5). A stud bolt 36 for rotatably supporting a left end 3A of the operation bar 3 (described later) for rotation is screwed into the nut 35. In FIG. 5, numeral 37 is a bushing made of resin. A link 38 is attached to the tip part of the rod 31 and a part on the left end 3A side of the operation bar 3 (described later) is fitted slidably into a guide hole 38A, which is substantially elliptical in plan, made in the link 38. A ring bushing 39 which is made of resin and is roughly elliptical in plan is fitted to the guide hole 38A for ensuring that the operation bar 3 is slid smoothly in the length direction in the guide hole 38A. The ring bushing 39 functions as a buffer member as described later for preventing a rattle or noise from occurring. The lower end of a coupling link 40 is attached to an intermediate part of the rod 31 and a hook part 4A at the left end of the wire 4 (described later) is coupled to a coupling hole 40A in the upper end of the coupling link 40.

Right slide mechanism 2

Figure 10:
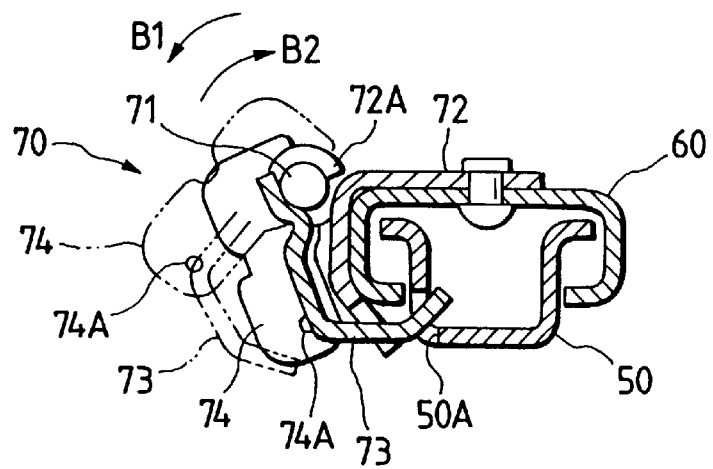
FIG. 10 is a sectional view taken along line X—X in FIG.7.

The right slide mechanism 2 comprises a lower rail 50, an upper rail 60, and a lock mechanism 70, as shown in FIGS. 7 to 10 and 13. The lower rail 50 is fixed onto the floor of the vehicle by front and rear brackets 51 and 52. The upper rail 60 is attached to the right bottom of the seat and is guided slidably back and forth relative to the lower rail 50. In the embodiment, the upper rail 60 shaped substantially like inverse U in cross section is guided slidably on the outside of the lower rail 50 shaped substantially like U in cross section, as shown in FIG. 10. A roller, a slider, and the like (not shown) are disposed between the lower rail 50 and the upper rail 60 so that the upper rail 60 can slide smoothly. Numeral 53 denotes a cap attached to the rear end of the lower rail 50.

The lock mechanism 70 locks the upper rail 60 at any desired slide adjustment position. In the embodiment, it locks and unlocks the upper rail 60 in response to the rotation direction of a rod 71. That is, the rod 71 is rotatably supported in bearing parts 72A and 72B (see FIGS. 7 and 8) of a plate 72 joined to the upper rail 60 so that it can be rotated on the back-and-forth axis in the arrow B1 and B2 directions (see FIGS. 9 and 10). A latch 73 is attached to the rod 71 and a plurality of lock holes 50A are made in a side of the lower rail 50. When the rod 71 is rotated in the arrow B1 direction, as indicated by the solid line in FIG. 10, the latch 73 is fitted into the opposed lock hole 50A for locking the upper rail 60 and when the rod 71 is rotated in the arrow B2 direction, as indicated by the phantom line in FIG. 10, the latch 73 is detached from the lock hole 50A for unlocking the upper rail 60. The upper end of a coupling link 74 is attached to the tip part of the rod 71 and a hook part 4B at the right end of the wire 4 (described later) is coupled to a coupling hole 74A in the lower end of the coupling link 74. A torsion bar 75 for urging the rod 71 in the arrow B1 direction is attached between the coupling link 74 and the plate 72.

Figure 13A:
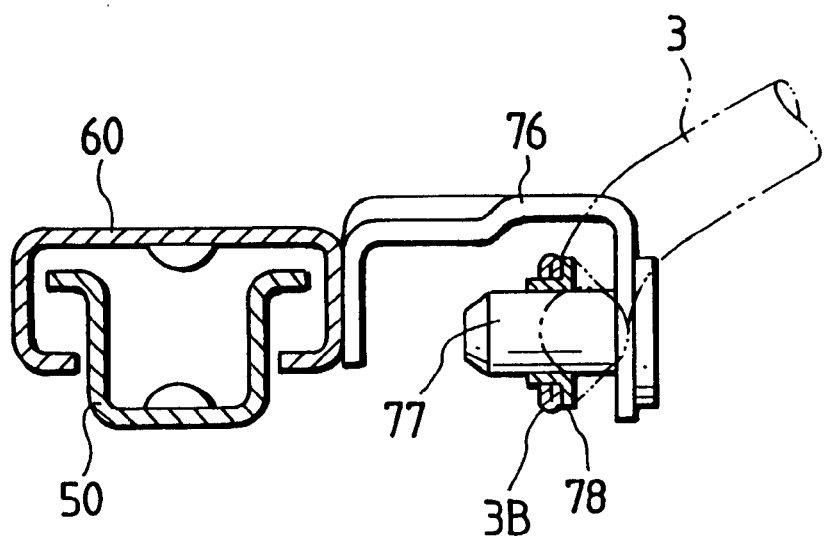
FIGS. 13A to 13C are sectional views to describe the operation of the rotatably-supporting part on the right end of the operation bar in the seat slide unit in FIG. 1.
Figure 13B:
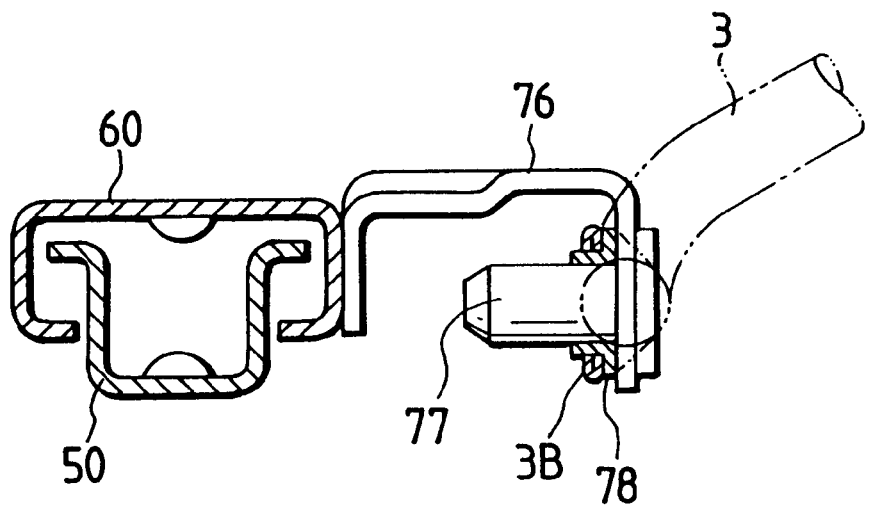
Figure 13C:
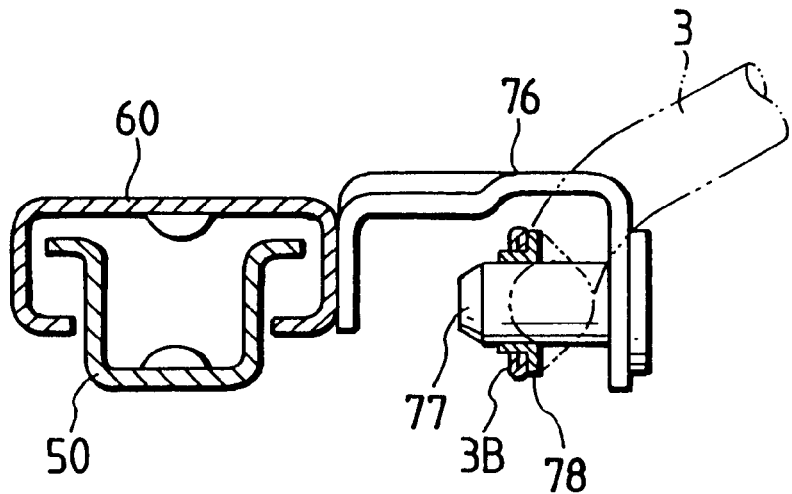

Further, a bracket 76 is attached to a side of the upper rail 60 and a support pin 77 for rotatably supporting a right end 3B of the operation bar 3 (described later) is set on the bracket 76, as shown in FIG. 13. The support pin 77 has a length to allow the right end 3B of the operation bar 3 to move from side to side as shown in FIGS. 13A to 13C. Numeral 78 denotes a bushing made of resin.

Operation bar 3

The operation bar 3 is of a shape formed by bending a steel pipe roughly like U and is crushed at both ends 3A and 3B. Holes rotatably supported in the bolt 36 and the support pin 77 for rotation are made in both the ends 3A and 3B and bushinges 37 and 38 are fitted into the holes. The operation bar 3 is extended in the intermediate portion between the left and right slide mechanisms 1 and 2 and is rotated up and down on the same horizontal axis of the bolt 36 and the support pin 77. The part on the left end 3A side of the operation bar 3 is inserted into the ring bushing 39 attached to the guide hole 38A of the link 38.

Figure 11:
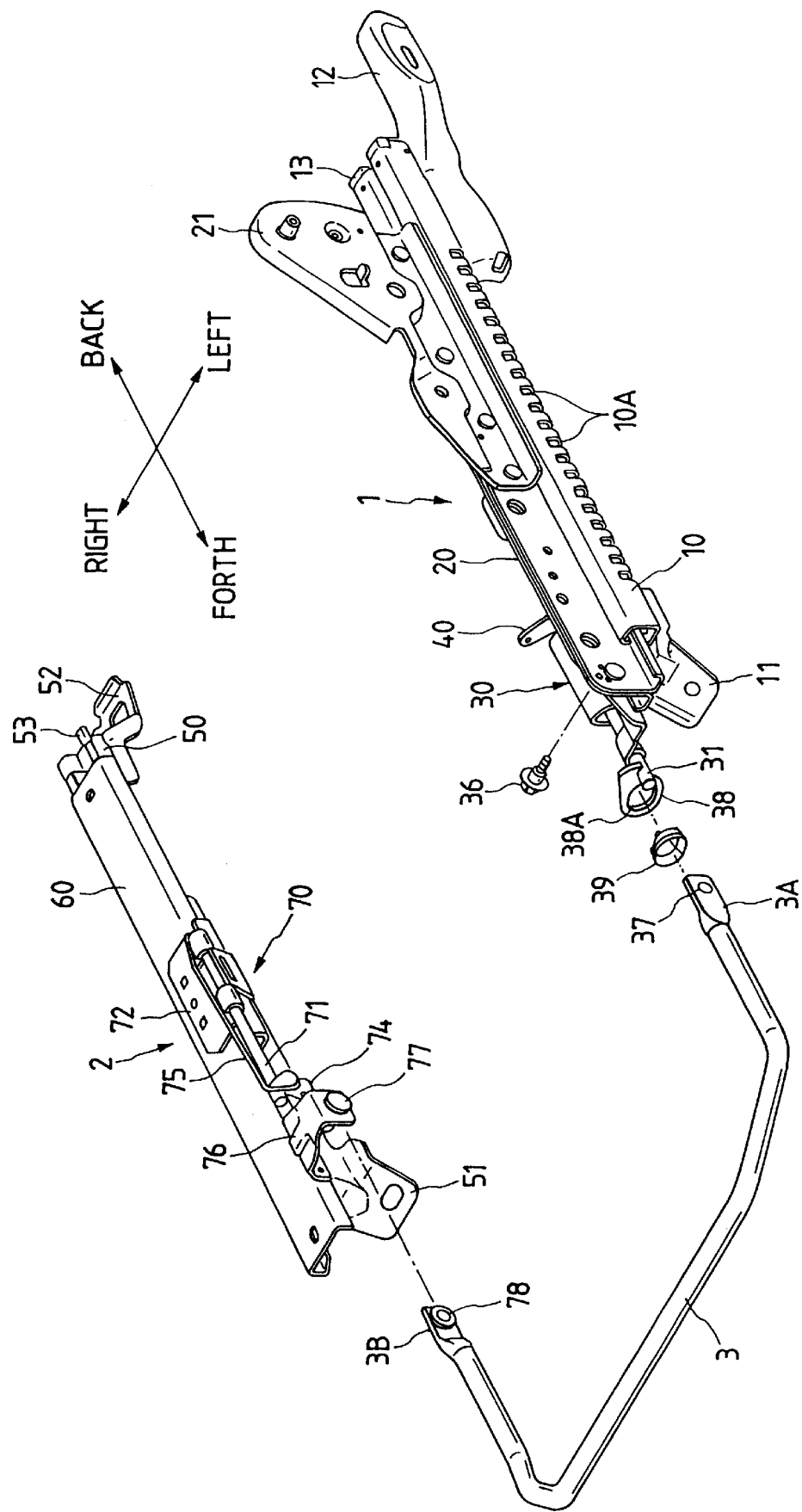
FIG. 11 is a exploded perspective view of the whole seat slide unit in FIG. 1.
Figure 12:
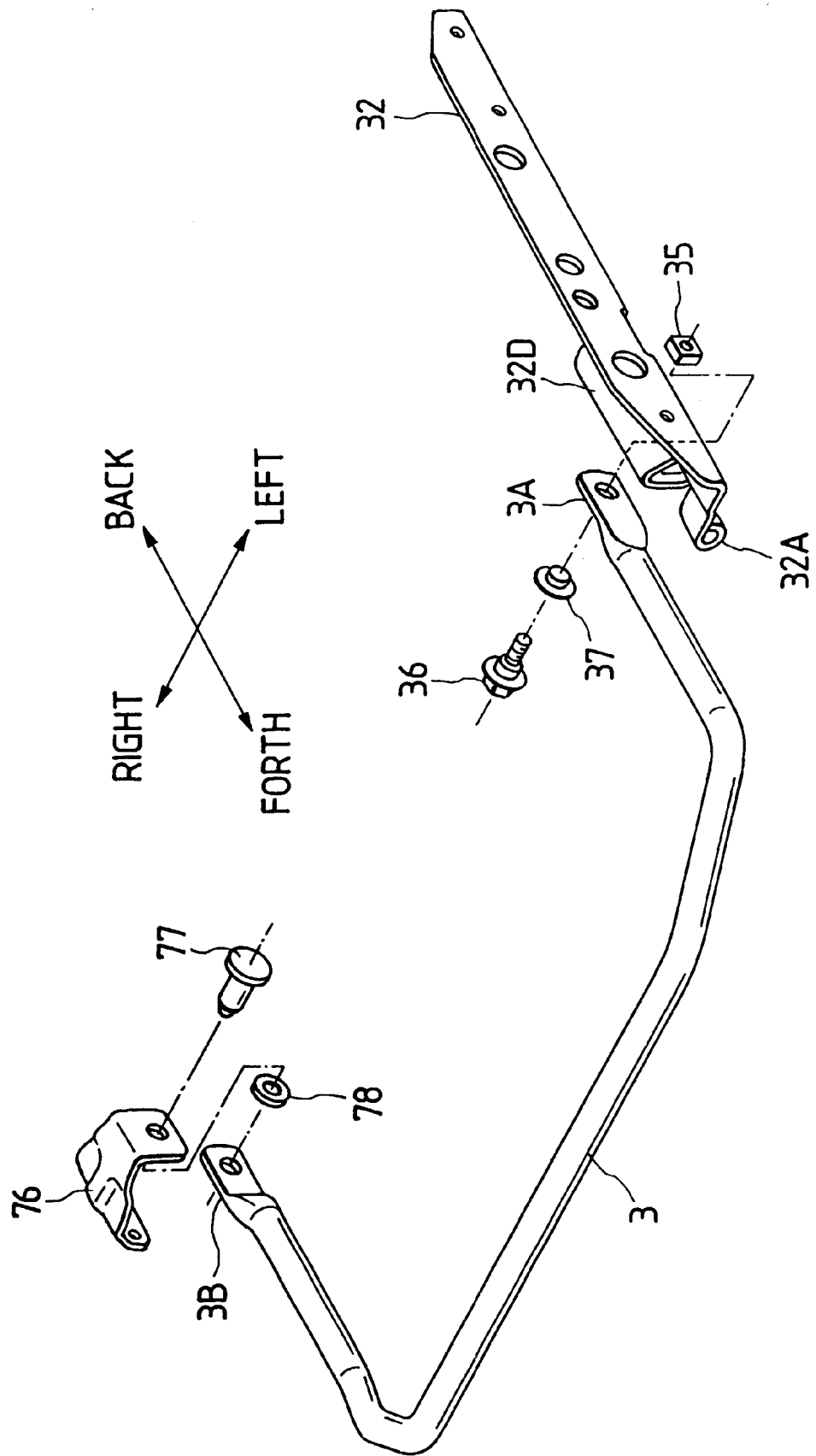
FIG. 12 is an exploded perspective view of only the rotatably-supporting parts of an operation bar in the seat slide unit in FIG. 1.

To attach the operation bar 3, the left end 3A is inserted into the guide hole 38A of the link 38, then is rotatably supported in the bend part 32D of the bracket 32 by the bolt 36, as shown in FIG. 11. At the time, previously the ring bushing 39 is fitted into the guide hole 38A of the link 38, the nut 35 is welded to the bend part 32D of the bracket 32, and the bolt 36 is screwed into the nut 35 through the bushing 37 fitted into the hole in the left end 3A of the operation bar 3. On the other hand, the right end 3B of the operation bar 3 to which the bushing 78 is fitted is inserted into the support pin 77 set on the bracket 76 and is rotatably supported. FIG. 12 is an exploded perspective view of only the rotatably-supporting parts of both the ends 3A and 3B of the operation bar 3. To install the seat slide unit of the embodiment on the vehicle, for example, previously the left slide mechanism 1 rotatably supporting the left end 3A of the operation bar 3 and the right slide mechanism 2 are separated and when the slide mechanisms 1 and 2 are installed in the vehicle, the right end 3B of the operation bar 3 can be rotatably supported in the support pin 77 of the right slide mechanism 2. Wire 4.

The hook parts 4A and 4B at both ends of the wire 4 are coupled to the coupling holes 40A and 74A of the coupling links 40 and 74 so that the wire 4 is put between the coupling holes 40A and 74A. Since the coupling hole 40A is made in the upper end of the coupling link 40 and the coupling hole 74A is made in the lower end of the coupling link 74, the wire 4 is put with both ends shifted up and down. Therefore, the wire 4 causes the rod 71 to be rotated in the arrow B2 direction in conjunction with rotation of the rod 31 in the arrow A2 direction. The wire 4, which is flexible, inevitably absorbs torsion and warp between both the left and right end parts.

Next, the function will be discussed.

Normally, the rods 31 and 71 are rotated in the arrow A1 and B1 directions by the urging forces of the twist coil spring 34 and the torsion bar 75 respectively and the latches 33 and 73 are fitted into the opposed lock holes 10A and 50A for locking the seat at the current slide position together with the upper rails 20 and 60. The link 38 is held at a rotation position in the arrow A1 direction together with the rod 31 as shown in FIG. 6 and the operation bar 3 is positioned at the right in FIG. 6 in the guide hole 38A of the link 38 and is held at a lower rotation position with the bolt 36 and the support pin 77 as the center.

To make a slide adjustment to the seat, first the intermediate part of the operation bar 3 is supported by hand and is rotated on the bolt 36 and the support pin 77 upward in the arrow C direction. As the operation bar 3 is thus rotated, it slides to the left in FIG. 6 in the guide hole 38A of the link 38 and rotates the link 38 in the arrow A2 direction against the twist coil spring 34 together with the rod 31, whereby the latch 33 is detached from the lock hole 10A. At the same time, the coupling link 74 is pulled by the wire 4, the rod 71 is rotated together with the coupling link 74 in the arrow B2 direction in FIG. 10 against the torsion bar 75, and the latch 73 is detached from the lock hole 50A.

After this, slide adjustment to the upper rails 20 and 60 together with the seat is made, then the operation force of the operation bar 3 is released. As a result, as shown in FIG. 6, the operation bar 3 is restored to the lower position by the tare of the operation bar 3 and the urging force of the twist coil spring 34 and the latch 33 is rotated and restored in the arrow A1 direction together with the rod 31 and is fitted into the corresponding lock hole 10A. Since the coupling link 40 is also rotated and restored in the arrow A1 direction, the wire 4 is loosened, the rod 71 is rotated and restored in the arrow B1 direction together with the coupling link 74 by the urging force of the torsion bar 75, and the latch 73 is fitted into the lock hole 50A. Resultantly, the seat is locked at the slide adjustment position together with the upper rails 20 and 60.

Thus, the lock mechanism 30 of the left slide mechanism 1 is caused to lock and unlock directly by the left end 3A side of the operation bar 3; on the other hand, the lock mechanism 70 of the right slide mechanism 2 is caused to lock and unlock indirectly via the left lock mechanism 30 and the wire 4. That is, the left and right lock mechanisms 30 and 70 are not coupled directly by the comparatively high-rigidity operation bar 3 and is only coupled by the flexible wire 4 and the right end 3B side of the operation bar 3 is only rotatably supported slidably from side to side.

The left and right lock mechanisms 30 and 70 are only coupled by the flexible wire 4 for absorbing torsion and warp between both the left and right ends. Thus, if the positional relationship between the left and right slide mechanisms 1 and 2 slightly shifts back and forth or up and down because of an attachment accuracy error of the unit itself, dimension errors of the components, deformation of the components at the operation time, etc., the wire 4 absorbs the shift or torsion between the left and right slide mechanisms 1 and 2, ensuring that the left and right lock mechanisms 30 and 70 operate smoothly. If the left slide mechanism 1 displaces so as to come close to the right slide mechanism 2 because of a shock load imposed on the plate 21 from the seat belt, the wire 4 displaces in the direction in which both the ends of the wire 4 come close to each other, and is loosened, and the left and right lock mechanisms 30 and 70 are maintained in the lock state.

Both the ends of the wire 4 are shifted up and down or back and forth as in the embodiment, whereby a tension is prevented from being put on the wire 4 immediately at the relative displacing time of the left and right slide mechanisms 1 and 2, so that a malfunction of the lock mechanism 30, 70 can be avoided. Particularly, the left end rather than the right end of the wire 4 is shifted to the rear, whereby if a shock load is imposed on the plate 21 from the seat belt and the left slide mechanism 1 displaces forward, the wire 4 is loosened and a malfunction of the lock mechanism 30, 70 can be avoided. If the seat slide unit of the embodiment is installed in the left seat of a vehicle, the plate 21 on which a shock load is imposed from the seat belt is attached to the upper rail 60 of the right slide mechanism 2. Thus, in this case, the right end rather than the left end of the wire 4 may be shifted to the rear.

In the embodiment, the lock mechanism 30 and the wire 4 are disposed ahead of the plate 21 on which a shock load is imposed from the seat belt. Thus, if a peel load is imposed on the rear end part of the upper rail 20 from the plate 21, the effect on the lock mechanism 30, 70 can be suppressed.

Further, the right end 3B side of the operation bar 3 is rotatably supported slidably from side to side relative to the right upper rail 60. Thus, if the spacing between the left and right slide mechanisms 1 and 2 changes because of an attachment accuracy error of the unit itself, dimension errors of the components, deformation of the components at the operation time, etc., the change is absorbed in the rotatably-supporting part on the right end 3B side of the operation bar 3. That is, the position of the right end 3B of the operation bar 3 shifts as in FIG. 13B or 13C in response to the change in the spacing between the left and right slide mechanisms 1 and 2 with the position in FIG. 13A as the reference. Therefore, if the positional relationship between the left and right slide mechanisms 1 and 2 slightly shifts or the operation bar 3 becomes slightly deformed, smooth rotation of the operation bar 3 is ensured.

Figure 15:
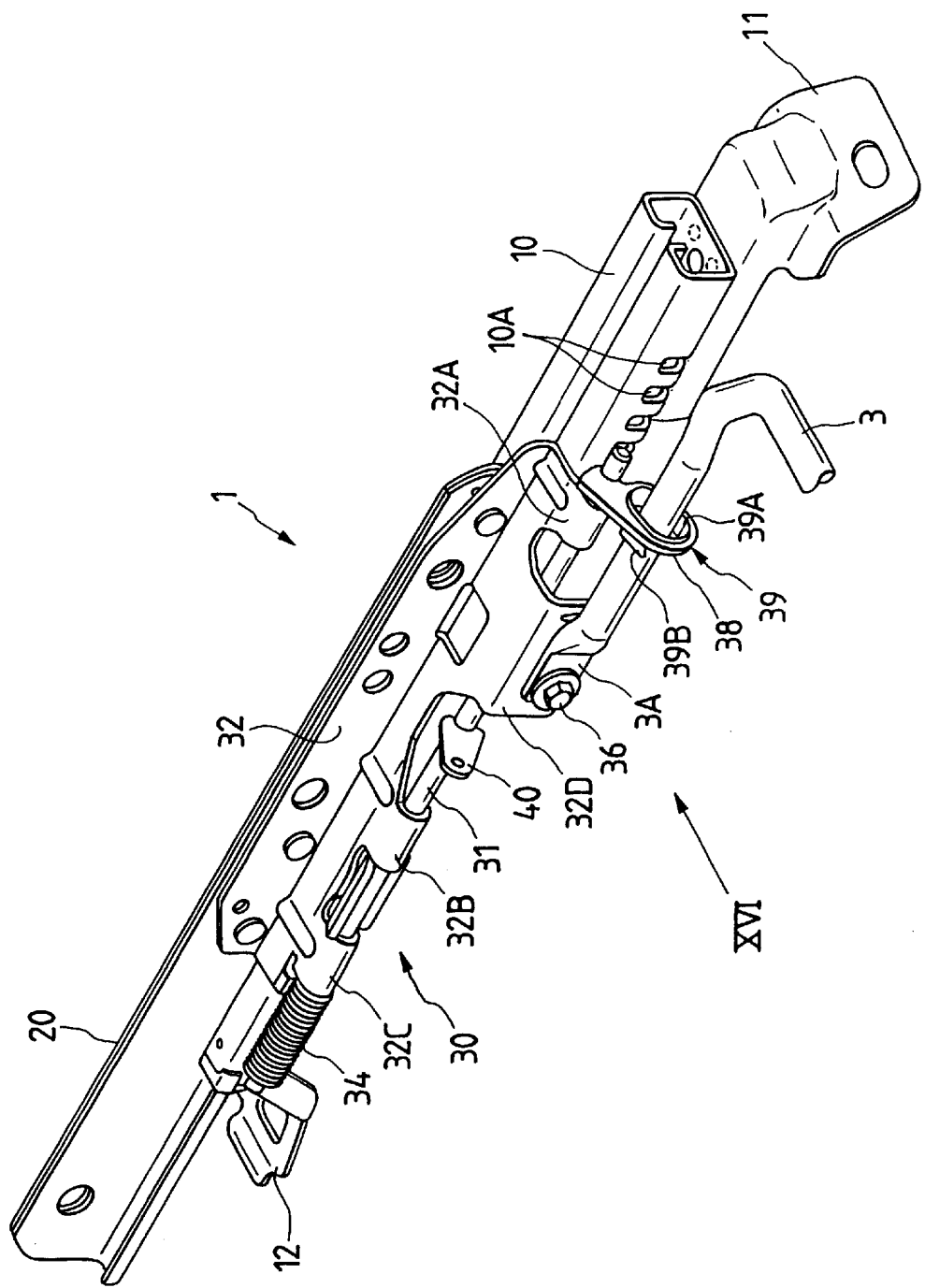
FIG. 15 is a perspective view of the coupling part of the operation bar and a left lock mechanism in the seat slide unit in FIG. 1.
Figure 17A:
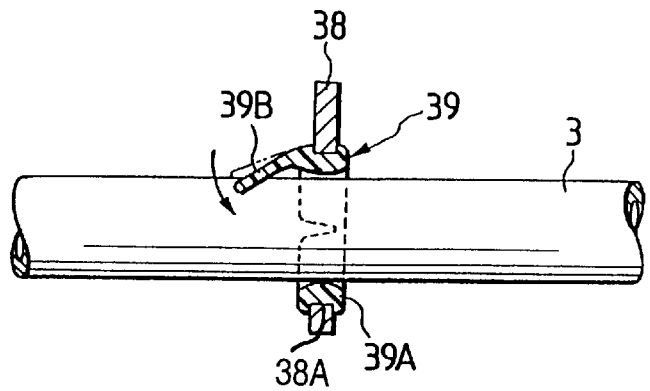
FIGS. 17A and 17B are sectional views of the coupling part of the operation bar and the left lock mechanism in FIG. 15, 17A is a sectional view of the coupling part in a non-operation state of the operation bar, and 17B is a sectional view of the coupling part in an operation state of the operation bar.
Figure 17B:
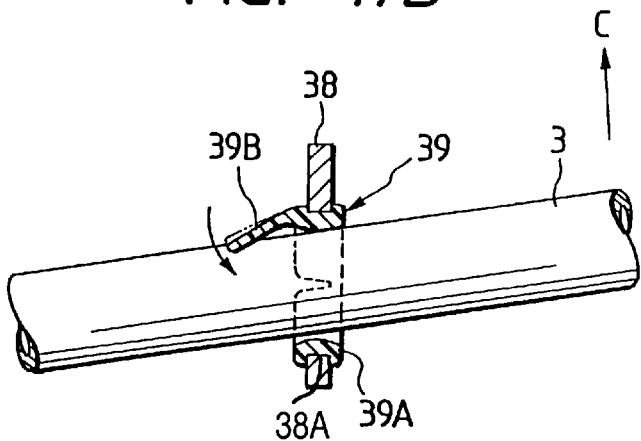

FIGS. 15, 16, and 17 are schematic representations of the joint part of the link 38 and the operation bar 3. As shown in FIGS. 17A and 17B, an opposed face part 39A extending annularly along the inner peripheral margin of the guide hole 38A and opposed to the outer periphery of the operation bar 3 and an elastic piece 39B pressed against an upper face part of the operation bar 3 are molded integrally in the resin ring bushing 39 fitted into the guide hole 38A of the link 38. As shown in FIGS. 17A and 17B, the inner peripheral surface of the opposed face part 39A is bent. The elastic piece 39B is inclined so as to form a predetermined angle toward the inside of the guide hole 38A as indicated by the solid lines in FIGS. 17A and 17B and the end part of the operation bar 3 is inserted into the guide hole 38A, whereby the elastic piece 39B becomes elastically deformed upward as indicated by the phantom lines in FIGS. 17A and 17B and is pressed against the upper face part of the operation bar 3.

As described above, the operation bar 3 is rotated, whereby it slides in the guide hole 38A of the link 38 and rotates the rod 31 via the link 38. When the operation bar 3 is at a lower move position in a non-operation state as shown in FIGS. 15 and 16, the end of the operation bar 3 is almost orthogonal to the link 38 as shown in FIG. 17A. When the operation bar 3 is at an upper move position at which it is operated in the arrow C direction, the end of the operation bar 3 is inclined with respect to the link 38 as shown in FIG. 17. Thus, the end of the operation bar 3 slides in the guide hole 38A while changing the positional relationship with the link 38.

When the end of the operation bar 3 thus slides, it comes in sliding contact with the inner peripheral surface of the opposed face part 39A in the ring bushing 39 and the steel link 38 guides the steel operation bar 3 indirectly via the resin ring bushing 39. Therefore, occurrence of noise caused by the steel parts coming in direct contact with each other is prevented. The elastic piece 39B of the ring bushing 39 pressed against the upper face part of the operation bar 3 absorbs vibration of the operation bar 3 as it becomes elastically deformed, suppressing a rattle of the operation bar 3. Thus, the ring bushing 39 serves as a buffer member.

Other Embodiments

Figure 14:
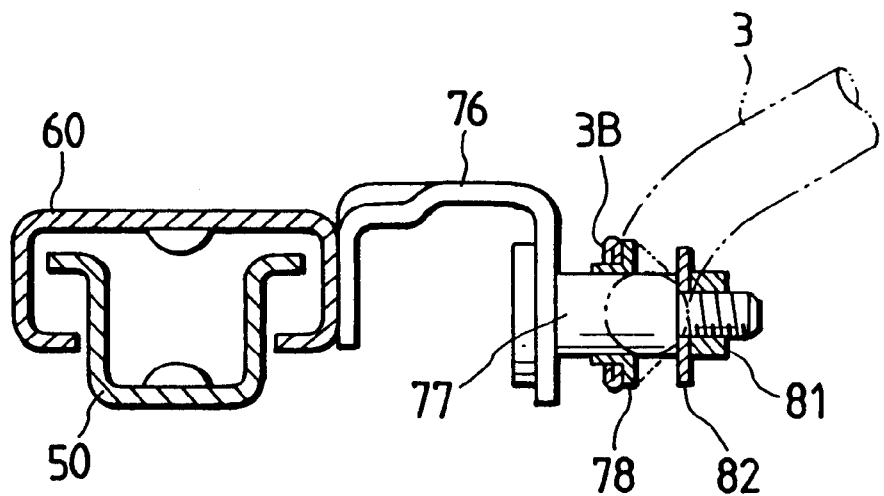
FIG. 14 is a sectional view of the main part in another embodiment of the invention.

The support pin 77 for rotatably supporting the right end 3B of the operation bar 3 may be set so as to project outward from the bracket 76, as shown in FIG. 14. In this example, a nut 81 is screwed to a male screw part at the tip of the support pin 77 and displacement of the right end 3B of the operation bar 3 is allowed between a washer 82 and the bracket 76.

Figure 18:
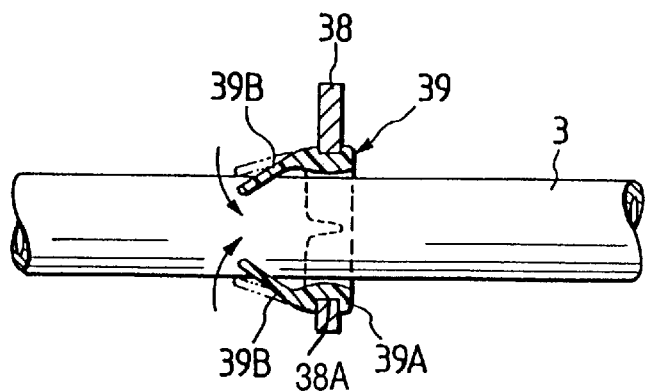
FIG. 18 is a sectional view of the coupling part of the operation bar and the left lock mechanism in another embodiment of the invention.

The resin bushing ring 39 as a buffer member may be formed with an upper elastic piece 39B and a lower elastic piece 39B as shown in FIG. 18 and the elastic pieces 39B may be pressed against an upper face part and a lower face part of the operation bar 3. Thus, the number of the elastic pieces 39B and their shapes are arbitrary; for example, the elastic pieces 39B may be formed intermittently or continuously along the circumferential direction of the ring bushing 39 or may also be formed on the right of the ring bushing 39 in FIG. 18. The opposed face part 39A may be formed at least at a position at which it abuts the end of the operation bar 3 in the rotation direction thereof; it is not limited to the annular shape as in the above-described embodiment. Therefore, the shape of the buffer member itself is not limited to the annular shape like the ring bushing 39.

Further, the coupling member for coupling the left and right lock mechanisms 30 and 70 is of a shape for absorbing a warp between the left and right ends; in addition to the wire 4, for example, a steel rod, etc., bent in an intermediate part like any shape such as U can also be used. Further, the coupling member such as the wire 4 may be abandoned and the right lock mechanism 70 may be designed so as to be caused to lock and unlock in response to the rotation direction of the operation bar 3 via the link 38 like the left lock mechanism 30. In this case, the right lock mechanism 70 is designed so as to be caused to lock and unlock in response to the rotation direction of the right end 3B of the operation bar regardless of sliding of the right end 3B from side to side.

Further, the structures of the lock mechanisms 30 and 70 are not limited to those of the above-described embodiment and are arbitrary. In short, one lock mechanism may be caused to lock and unlock with the operation bar 3 and the other may be caused to lock and unlock via the coupling member such as the wire 4 accordingly.

As described above, in the seat slide unit of the invention, only either of the left and right lock mechanisms is coupled directly to the operation bar of comparatively high rigidity and the left and right lock mechanisms are coupled via the coupling member shaped so as to absorb a warp between both ends. Thus, if the positional relationship between the left and right slide mechanisms slightly shifts because of an attachment accuracy error of the unit itself, dimension errors of the components, deformation of the components at the operation time, etc., the coupling member can absorb the shift or torsion between the left and right slide mechanisms. Resultantly, while the usefulness of operating the left and right mechanisms with the operation bar placed between left and right upper rails is provided, the left and right lock mechanisms can be caused to lock and unlock smoothly and reliably in synchronization with each other with the operation bar.

The lock mechanisms and the coupling member are disposed ahead of the attachment part of a seat belt, whereby if a peel load is imposed on a rear part of the upper rail from the attachment part, the effect on the lock mechanism can be suppressed.

Further, the coupling positions at both ends of the coupling member are shifted at least back and forth or up and down, whereby a malfunction of the lock mechanism when the positional relationship between the left and right upper rails shift can be avoided.

Further, a wire, a rod bent in an intermediate portion, or the like can be used as the coupling member.

Still further, as described above, in the seat slide unit of the invention, the operation bar rotatably supported in the left and right upper rails for rotation is rotatably supported at either of the left and right end parts slidably from side to side, whereby if an error occurs in the spacing between the left and right upper rails because of an attachment accuracy error of the unit itself, dimension errors of the components, deformation of the components at the operation time, etc., the error can be absorbed in one rotatably-supporting part of the operation bar. Resultantly, while the usefulness of operating the mechanisms with the operation bar placed between left and right upper rails is provided, the lock mechanisms can be caused to lock and unlock smoothly and reliably.

The support pin on the upper rail side is fitted to the hole on the operation bar side slidably from side to side, whereby one rotatably-supporting part of the operation bar can be formed easily.

The tip of the support pin can be inserted into the hole on the operation bar side, whereby the operation bar can be placed between the left and right upper rails during installation work of the unit itself; the flexibility of installation workability of the unit itself is enhanced and the installation workability can be improved.

Further, the detachment prevention member for preventing the operation bar from being detached is attached to the tip of the support pin, whereby the side-to-side slide range of the operation bar can be restricted.

Still further, as described above, in the seat slide unit of the invention, the buffer member made of a resin is attached to the link for coupling the lock mechanism and the end of the operation bar and is formed with the opposed face part opposed to the end of the operation bar and the elastic piece pressed against the end part of the operation bar, whereby the opposed face part of the buffer member is placed in the space between the link and the operation bar for preventing noise from occurring and the elastic piece of the buffer member can absorb vibration of the operation bar for suppressing a rattle of the operation bar; moreover, the structure of the whole unit can be simplified and costs can be reduced.

The guide hole fitted slidably to the end part of the operation bar is made in the tip part of the link and in addition, the bushing ring formed on the inner peripheral surface with the opposed face part opposed to the end part of the operation bar is fitted into the guide hole as the buffer member, whereby while occurrence of noise is prevented, displacement of the end part of the operation bar in various directions can be restricted.

Further, the elastic piece of the buffer member urges at least the end part of the operation bar downward, whereby the urging force of the elastic piece can be used effectively as the holding force for holding the operation bar at a non-operation position.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A seat slide unit comprising:
    left and right upper rails adapted for connection to a bottom of a seat so as to extend in a fore-and-aft direction relative to the seat;
    left and right lower rails for guiding said left and right upper rails slidably back and forth relative to the seat;
    a left lock mechanism being capable of locking and unlocking said left upper rail with respect to said left lower rail;
    a right lock mechanism being capable of locking and unlocking said right upper rail with respect to said right lower rail;
    an operation bar being rotatably supported at left and right end parts in front parts of said left and right upper rails and extending in an intermediate portion from side to side for causing one of said left and right lock mechanisms to lock and unlock in response to a rotation direction of the intermediate portion; and
    a coupling member being coupled at left and right end parts to said left and right lock mechanisms and shaped so as to absorb a warp between the left and right end parts for causing the other to lock and unlock in conjunction with one of said left and right lock mechanisms,
        wherein coupling positions of the left and right end parts of said coupling member and said left and right lock mechanisms differ at least back and forth or up and down.

2. A seat slide unit according to claim 1, further comprising an attachment part of a seat belt which is provided in a rear part of one of said left and right upper rails, and wherein said left and right lock mechanisms and said coupling member are disposed ahead of the attachment part.

3. A seat slide unit according to claim 1, wherein said coupling member is a wire.

4. A seat slide unit according to claim 1, wherein said coupling member is a rod bent in an intermediate portion.

5. A seat slide unit comprising:

left and right upper rails adapted for attachment to a bottom of a seat so as to extend in a fore-and-aft direction relative to the seat;

left and right lower rails for guiding said left and right upper rails slidably back and forth relative to the seat;

an operation bar being rotatably supported at left and right end parts between said left and right upper rails and rotatably supported at one of the left and right end parts slidably from side to side;

lock mechanisms being capable of locking and unlocking said left and right upper rails with respect to said left and right lower rails in response to a rotation direction of said operation bar; and a support pin provided in one of said left and right upper rails, said support pin extending from side to side, and wherein a hole fitted to said support pin slidably is made in one of the left and right ends of said operation bar corresponding to said left or right upper rail provided with the support pin.

6. A seat slide unit according to claim 5, wherein said support pin is fixed on one of said left and right upper rails and projects in a direction away from the other so that it can be inserted into the hole of said operation bar.

7. A seat slide unit according to claim 6, further comprising a detachment prevention member for preventing said operation bar from being detached, said detachment prevention member being attached to a tip of said support pin.

8. A seat slide unit according to claim 5, wherein said support pin is fixed on one of said left and right upper rails and projects toward the other so that it can be inserted into the hole of said operation bar.

9. A seat slide unit according to claim 8, further comprising a detachment prevention member for preventing said operation bar from being detached, said detachment prevention member being attached to a tip of said support pin.

10. A seat slide unit comprising:

left and right upper rails adapted for connection to a bottom of a seat so as to extend in a fore-and-aft direction relative to the seat;

left and right lower rails for guiding said left and right upper rails slidably back and forth relative to the seat;

an operation bar having an essentially U-shaped cross-section and rotatably supported at both end parts in said left and right upper rails on a side-to-side axis;

left and right lock mechanisms being capable of locking and unlocking said left and right upper rails with respect to said left and right lower rails in response to a rotation direction of said operation bar, wherein at least one of said left and right lock mechanisms is coupled to said operation bar via a link which is rotatably supported at a base end part of one of said left and right upper rails which extends along an axis which extends in the essentially fore-and-aft direction and which engages a tip part of one of said end parts of said operation bar; and a buffer member being attached to the tip part of said link, said buffer member being made of a resin, and having an opposed face part opposed to the end part of said operation bar and an elastic piece elastically pressed against the end part of said operation bar.

11. A seat slide unit according to claim 10, wherein a guide hole fitted slidably relatively to the end part of said operation bar is made in the tip part of the link, and wherein said buffer member is a ring bushing fitted into the guide hole and formed on an inner peripheral surface with the opposed face part.

12. A seat slide unit according to claim 10, wherein the elastic piece of said buffer member is pressed against at least an upper face part of the end part of said operation bar for downward urging said operation bar.

* * * * *